United States Patent
Nagasaki et al.

(10) Patent No.: US 6,755,333 B2
(45) Date of Patent: Jun. 29, 2004

(54) TAPE GUIDE POST MECHANISM

(75) Inventors: Eiji Nagasaki, Osaka (JP); Akio Konishi, Hyogo (JP); Koichiro Hirabayashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/161,261

(22) Filed: May 31, 2002

(65) Prior Publication Data

US 2002/0195475 A1 Dec. 26, 2002

(30) Foreign Application Priority Data

Jun. 21, 2001 (JP) ........................................ 2001-187711

(51) Int. Cl.[7] .............................................. G11B 15/66
(52) U.S. Cl. ....................... 226/194; 226/180; 226/190; 384/192; 360/95
(58) Field of Search ................................ 226/194, 180, 226/190; 384/192, 219, 226, 238, 295, 416; 360/95

(56) References Cited

U.S. PATENT DOCUMENTS

| | | | | |
|---|---|---|---|---|
| 3,592,518 A | * | 7/1971 | Pfister et al. ............... | 384/219 |
| 3,656,677 A | * | 4/1972 | Stepanek et al. ........... | 226/180 |
| 4,497,426 A | * | 2/1985 | Osanai ....................... | 226/190 |
| 4,556,922 A | * | 12/1985 | Erhart ......................... | 360/85 |
| 4,750,878 A | * | 6/1988 | Nix et al. .................... | 384/295 |
| 5,790,342 A | * | 8/1998 | Konishi et al. .............. | 360/95 |
| 5,833,109 A | * | 11/1998 | You ............................. | 226/194 |
| 5,901,011 A | * | 5/1999 | Chae et al. .................. | 360/85 |
| 6,104,569 A | * | 8/2000 | Chae et al. .................. | 360/85 |

* cited by examiner

*Primary Examiner*—Kathy Matecki
*Assistant Examiner*—Sang K Kim
(74) *Attorney, Agent, or Firm*—Renner, Otto, Boisselle & Sklar, LLP (57) ABSTRACT

A tape guide post mechanism for guiding running of a tape is provided. The tape guide post mechanism includes a post arm, the post arm including a tape guide post, around which the tape is looped, and which guides running of the tape, and a hole. The tape guide post mechanism further includes an arm shaft which engages with the hole and rotatably supports the post arm. The arm shaft has an elastic portion which presses a portion of the post arm. As a result a small sized, inexpensive tape guide post mechanism, which has a simple structure, in which the slant of each element is accurately controlled, and which achieves decreases in size and cost of the magnetic recording/reproducing apparatus, can be obtained.

6 Claims, 11 Drawing Sheets

(PRIOR ART)

FIG. 7

(PRIOR ART)

FIG. 8

(PRIOR ART)

FIG.9

(PRIOR ART)

FIG. 10

TAPE GUIDE POST MECHANISM

BACKGROUND OF THE INVENTION

1. Field of the Invention

The present invention relates to a tape guide post mechanism for use in a magnetic recording/reproducing apparatus, such as a videotape recorder (VTR).

2. Description of the Related Art

In recent years, there has been a growing demand for decreases in size and price of magnetic recording/reproduction apparatus, such as VTRs, camcorders, etc.

Hereinafter, a tape guide post mechanism for use in a conventional magnetic recording/reproducing apparatus is described.

Figure 6:
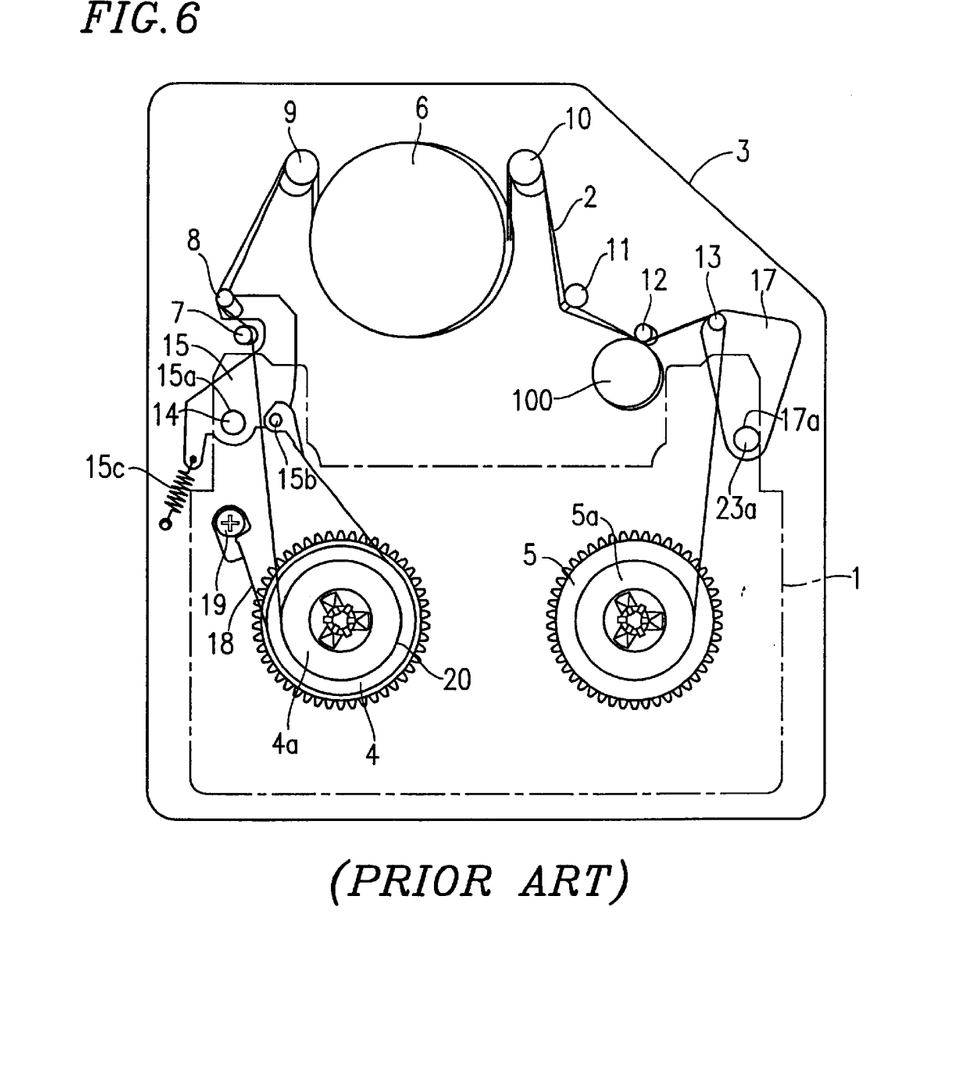
FIG. 6 is a plan view of a magnetic recording/reproducing apparatus which uses a conventional tape guide post mechanism.

FIG. 6 is a plan view of a magnetic recording/reproducing apparatus which uses a conventional tape guide post mechanism. FIG. 6 shows that a tape 2 has been pulled out from a cassette 1 by tape guide posts 8, 9, 10, and 13, and looped around a rotatable head cylinder 6. In this state, recording/reproduction of data or information to/from the tape 2 can be performed. In FIG. 6, some parts are omitted (i.e., not shown) for clarity of illustration.

As shown in FIG. 6, reference numeral 2 denotes a tape, which is wound around an S-reel 4a and a T-reel 5a stored in the cassette 1. For clarity of illustration, the external shape of the cassette 1 is represented by a dashed line. Reference numeral 3 denotes a base of the magnetic recording/reproducing apparatus, on which the cassette 1 is mounted. Reference numeral 4 denotes an S-reel bed, which is rotatably and axially supported on the base 3. The S-reel bed 4 is engaged, and rotates integrally, with the S-reel 4a.

Reference numeral 5 denotes a T-reel bed, which is rotatably and axially supported on the base 3. The T-reel bed 5 is engaged, and rotates integrally, with the T-reel 5a. Reference numeral 15 denotes a tension arm (post arm). The tension arm 15 has: a tension post 8, which is one of the tape guide posts, and which is one of the constituent elements of a tape running system; and a hole 15a. The base 3 has a tension arm shaft 14, which is provided so as to penetrate through the hole 15a, so that the tension arm shaft 14 rotatably supports the tension arm 15. Reference numeral 18 denotes a tension band, one end of which is supported by a shaft 15b formed in the tension arm 15, and the other end which is fixed to the base 3 with a band fixture screw 19. The intermediate portion of the tension band 18 is wound around a cylindrical portion 20 of the S-reel bed 4. The tension arm 15 is urged by an urging spring 15c around the tension arm shaft 14 in a counterclockwise direction.

Reference numeral 6 denotes a rotatable head cylinder provided on the base 3. The rotatable head cylinder 6 has a rotatable magnetic head, through which a signal is recorded in/reproduced from the tape 2 that is looped around the rotatable head cylinder 6. Reference numeral 7 denotes a S1-post, which is one of the tape guide posts. Reference numeral 11 denotes a T2-post, which is one of the tape guide posts. The S1-post 7 and the T2-post 11 are fixed to the base 3, and are constituent elements of the tape running system. Reference numeral 9 denotes a S2-post, which is one of the tape guide posts. Reference numeral 10 denotes a T1-post, which is one of the tape guide posts. The S2-post 9 and the T1-post 10 are constituent elements of the tape running system. Reference numeral 12 denotes a capstan shaft, and reference numeral 100 denotes a pinch roller. The tape 2 which is sandwiched by the capstan shaft 12 and the pinch roller 100 is driven in a forward/reverse direction by forward/reverse rotation of the capstan shaft 12. Reference numeral 13 denotes a T3-post, which is one of the tape guide posts, and is a constituent element of the tape running system. The T3-post 13 is formed in a T3-arm 17 which is a post arm. The T3-arm 17 has a hole 17a. A T3-arm shaft 23a which is formed on the base 3 is provided so as to penetrate through the hole 17a, so that the T3-arm shaft 23a rotatably supports the T3-arm 17. FIG. 6 shows that the tape 2 has been pulled out of the cassette 1 by the tension post 8, the S2-post 9, the T1-post 10, and the T3-post 13.

The tape running system shown in FIG. 6 is now described. The tape 2 pulled out from the S-reel 4a is first looped around the S1-post 7 on the base 3, and then, looped around the tension post 8 and the S2-post 9. Further, the tape 2 is looped around the rotatable head cylinder 6, and around the T1-posts 10 and the T2-posts 11. Thereafter, the tape 2 is looped around the capstan shaft 12 and the T3-post 13. Thereafter, the tape 2 is wound around the T-reel 5a.

Hereinafter, an operation of the tape guide post mechanism of the conventional magnetic recording/reproducing apparatus having the above described structure is described with reference to FIGS. 7 through 9.

Figure 7:
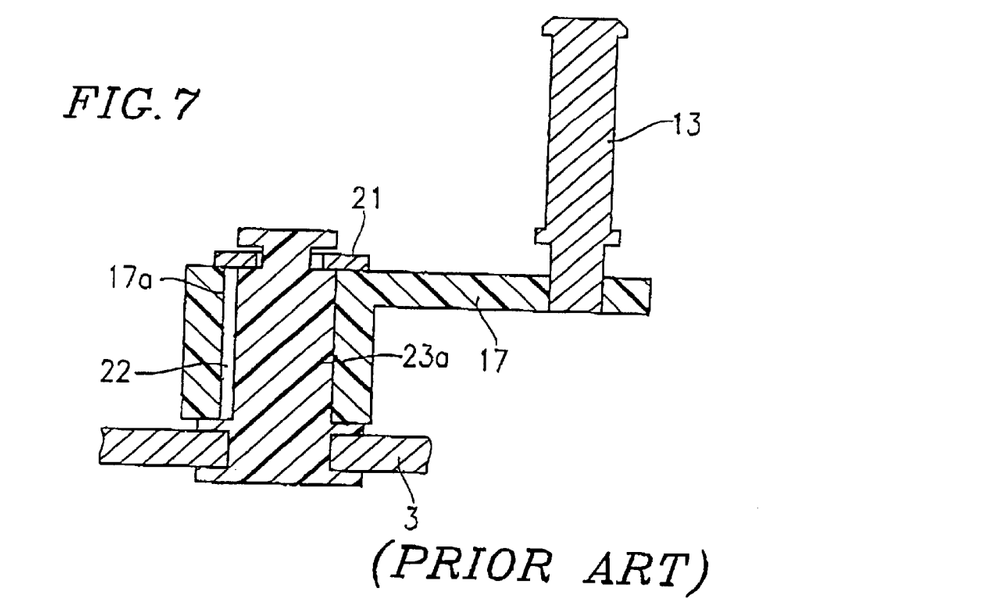
FIG. 7 is a cross-sectional view showing a T3-arm of the conventional tape guide post mechanism.

FIG. 7 is a cross-sectional view showing the T3-arm 17 of the conventional tape guide post mechanism. FIG. 8 is a cross-sectional view showing the state of the T3-arm 17 when a tape tension is applied to the T3-arm 17. FIG. 9 is a perspective view showing the details about engagement between the hole 17a of the T3-arm 17 and the T3-arm shaft 23a.

In FIG. 7, the tape 2 is not looped around the T3-post 13. The hole 17a of the T3-arm 17 is rotatably engaged with the T3-arm shaft 23a formed on the base 3. The T3-arm 17 is prevented by a stoppage ring 21 from being upwardly disengaged from the T3-arm shaft 23a. Further, some space 22 is necessarily provided between the internal wall surface of the hole 17a and the external side surface of the T3-arm shaft 23a such that the T3-arm 17 is rotatable around the T3-arm shaft 23a.

Figure 8:
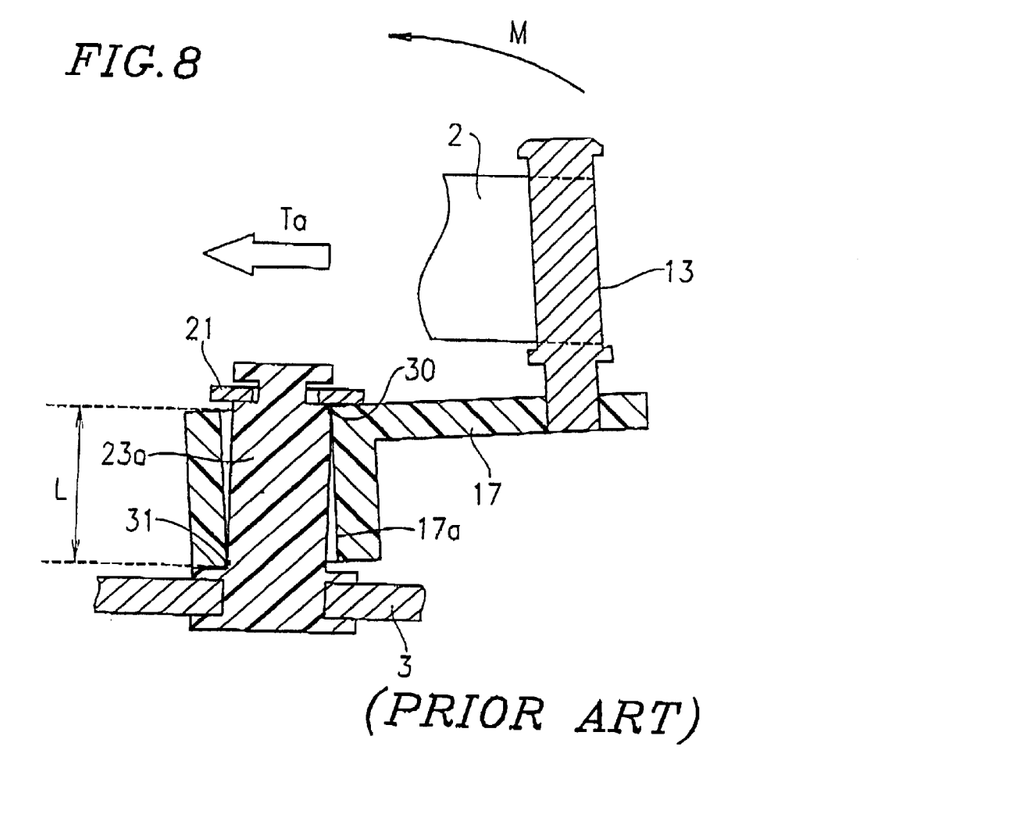
FIG. 8 is a cross-sectional view showing the state of a T3-arm when a tape tension is applied to the T3-arm.

When the tape 2 is looped around the T3-post 13 so as to have a predetermined contact area therebetween which corresponds to a predetermined angular distance around the T3-post 13 so that the tape 2 can run, tape tension Ta is applied to the T3-post 13 as shown in FIG. 8. Due to tape tension Ta, a rotation moment is caused in the T3-arm 17 and the T3-post 13 in the direction of arrow M. Accordingly, the T3-arm 17 slightly rotates in the direction of arrow M as shown in FIG. 8. As a result, the internal wall surface of the hole 17a of the T3-arm 17 is in contact with the external side surface of the T3-arm shaft 23a at an upper contact point 30 and a lower contact point 31 as shown in FIGS. 8 and 9.

Figure 9:
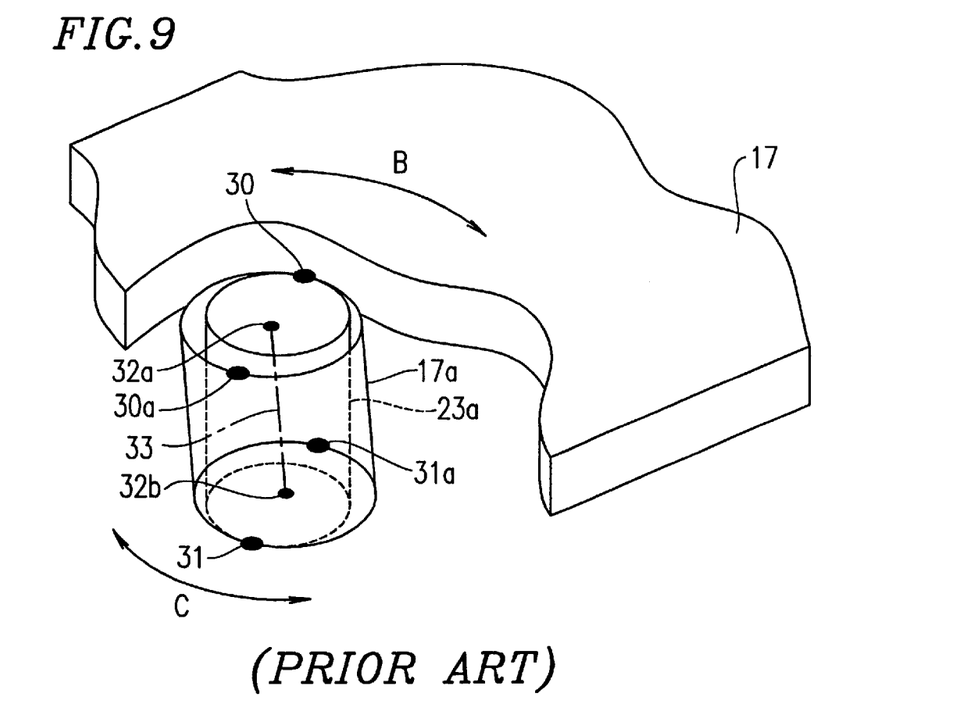
FIG. 9 is a perspective view showing the details about engagement between a hole of a T3-arm and a T3-arm shaft.

FIG. 9 shows the slanted T3-arm 17 only in the vicinity of the T3-arm shaft 23a. As seen from FIG. 9, a hole center line 33 between the center of the upper opening of the hole 17a of the T3-arm 17 ("upper hole center 32a") and the center of the lower opening of the hole 17a of the T3-arm 17 ("lower hole center 32b") is slanted with respect to the longitudinal axis of the T3-arm shaft 23a.

However, the above conventional structure involves some problems as described below with reference to FIGS. 8 and 9.

Since the T3-post 13 is a constituent element of the tape running system, the slant of the T3-post 13 must be accurately determined. However, due to small, external disturbing factors, such as a variation of tape tension Ta, a variation of friction force generated between the T3-post 13 and the tape 2, etc., the position of the upper contact point 30 unstably shifts in a direction indicated by arrow B of FIG. 9, and the position of the lower contact point 31 unstably shifts along a direction indicated by arrow C of FIG. 9. That is, the slant of the hole center line 33 with respect to the axis of the T3-arm shaft 23a is varied, and the amount and direction of slant of the T3-post 13 are unstable.

Further, in the case where tape tension Ta is not sufficiently large with respect to the weights of the T3-arm 17 and the T3-post 13, upper and lower contact points are sometimes formed at positions opposite to the upper contact point 30 and the lower contact point 31, respectively, with respect to the hole center line 33. That is, in some cases, the T3-arm shaft 23a comes in contact with the hole 17a at an upper contact point 30a and a lower contact point 31a, as shown in FIG. 9, according to the attitude of the magnetic recording/reproducing apparatus.

Furthermore, the magnitude and direction of the force applied to the T3-post 13 due to the tape tension are different between a case where the tape 2 runs in a forward direction and a case where the tape 2 runs in a reverse direction. Thus, when the running direction of the tape 2 changes between the forward and reverse directions, the positions of the upper contact point 30 and the lower contact point 31 shift, so that the amount and direction of slant of the T3-post 13 are unstable.

As described above, in the conventional structure, the amount and direction of slant of the T3-post 13 are essentially and necessarily unstable because of the attitude change or vibration of the magnetic recording/reproducing apparatus, a change in the running state of the tape 2, such as the running direction of the tape 2, the tape tension, or the like. Thus, in the conventional tape guide mechanism, the variation of the slant of the tape guidepost (T3-post 13) cannot be decreased without decreasing the space 22 shown in FIG. 7.

For example, in a practical product design, the hole 17a of the T3-arm 17 is formed at high accuracy so as to have a diameter of φ3.015 mm±0.005 mm, and the T3-arm shaft 23a is formed so as to have an outside diameter of φ3 mm±0.005 mm, such that the space 22 is minimized. In this case, the minimum space is 0.005 mm, and the maximum space is 0.025 mm. The variation of the slant of the T3-post 13 can be minimized by minimizing the space 22 even in the case where the upper contact point 30 and the lower contact point 31 greatly shift. However, the hole 17a and the T3-arm shaft 23a have to be formed at such a high accuracy in order to minimize the space 22.

In FIG. 8, reference mark L denotes an effective shaft length of the T3-arm shaft 23a. In a general camcorder, effective shaft length L is about 4 mm. In the case where the maximum space of 0.025 mm is obtained, the maximum slant angle θ is represented by the following expression:

$$\theta = \tan^{-1}(0.025/4) = 0.36°$$

Thus, in this case, the slant of the T3-post 13 can vary by ±0.36° at a maximum only for the reason of the largeness of the space 22. As a matter of course, the variation of the slant of the T3-post 13 can be reduced by increasing effective shaft length L, but in such a case, the size of the recording/reproducing apparatus increases.

The variation of the slant of the T3-post 13 with respect to the hole 17a, which is caused in a production process, is generally about ±0.16° even in a product which has met the requirement for slant in a total inspection process. The variation of a slant of the T3-arm shaft 23a with respect to the base 3, which is caused in the production process, is also generally about ±0.16° even in a product which has met the requirement for slant in a total inspection process. Thus, the maximum value of the sum of these variations caused in the production process and the variation of the slant of the T3-post 13, which is caused due to the space 22, is:

$$(\pm 0.36°) + (\pm 0.16°) + (\pm 0.16°) = \pm 0.68°.$$

Since a tape guide post of a VTR must generally be formed in an accurate fashion only with a small variation of about ±0.5°, each of the above tolerances cannot be increased any more. Thus, in addition to highly accurate production of each element, the total inspection must be performed solely for each element, while the total inspection must also be performed for each element in an assembled product in respect to the slant of the element.

In summary, in a conventional tape guide post mechanism, a hole of a post arm (in this conventional example, the hole 17a of the T3-arm 17) must be formed so as to have an accurate inner diameter; an arm shaft (the T3-arm shaft 23a) must be formed so as to have an accurate diameter; the slant of a tape guide post (the T3-post 13) with respect to the hole of the post arm must be accurately controlled; and the slant of the arm shaft with respect to the base (the base 3) must be accurately controlled. Accordingly, the production cost for each of these elements increases. Further, the total inspection must be performed in respect to accuracy of the slant of each element, the diameter of a hole, the diameter of a shaft, etc. As a result, the number of production steps increases, and the production cost further increases. Furthermore, the longitudinal length of the arm shaft (effective shaft length L) cannot be decreased, so that the size of the recording/reproducing apparatus cannot be decreased.

SUMMARY OF THE INVENTION

According to one aspect of the present invention, a tape guide post mechanism for guiding running of a tape includes: a post arm, the post arm including a tape guide post, around which the tape is looped, and which guides running of the tape, and a hole; an arm shaft which engages with the hole and rotatable supports the post arm, wherein the arm shaft has an elastic portion which presses a portion of the post arm.

In one embodiment of the present invention, an external surface of the arm shaft comes in contact with the hole of the post arm at two points in an upper opening of the hole and at two points in a lower opening of the hole.

In another embodiment of the present invention, the elastic portion and remainder of the arm shaft are made of different materials or parts.

According to another aspect of the present invention, a tape guide post mechanism for guiding running of a tape includes: a post arm, the post arm including a tape guide post, around which the tape is looped, and which guides running of the tape, and a hole; an arm shaft which engages with the hole and rotatably supports the post arm, wherein the post arm has an elastic portion which presses an external surface of the arm shaft.

In one embodiment of the present invention, the external surface of the arm shaft comes in contact with the hole of the post arm at two points in an upper opening of the hole and at two points in a lower opening of the hole.

In another embodiment of the present invention, the elastic portion and remainder of the post arm are made of different materials or parts.

According to the present invention, a small sized, inexpensive tape guide post mechanism, in which the slant of each element is accurately controlled, and which achieves a decrease in size of a magnetic recording/reproducing apparatus, can be obtained.

According to the present invention, an elastic portion of an arm shaft presses a portion of a post arm, whereby a constant rotational moment is caused in the post arm. Due to this constant rotational moment, variations in the amount and direction of the slant of the tape guide post can be reduced. As a result, a small sized, inexpensive tape guide post mechanism, which has a simple structure, in which the slant of each element is accurately controlled, and which achieves decreases in size and cost of the magnetic recording/reproducing apparatus, can be obtained. Furthermore, if an elastic portion is formed in the arm shaft, it is not necessary to form an elastic portion in the post arm, and therefore, the post arm can be formed in a simple structure as can be in a conventional structure.

According to the present invention, an elastic portion of a post arm presses an external surface of an arm shaft, whereby a constant rotational moment is caused in the post arm. Due to this constant rotational moment, variations in the amount and direction of the slant of the tape guide post can be reduced. As a result, a small sized, inexpensive tape guide post mechanism, which has a simple structure, in which the slant of each element is accurately controlled, and which achieves decreases in size and cost of the magnetic recording/reproducing apparatus, can be obtained. Furthermore, if an elastic portion is formed in the post arm, it is not necessary to form an elastic portion in the arm shaft, and therefore, an inexpensive, strong arm shaft can be formed from a simply structured shaft, such as a metal carved shaft or a header shaft.

According to the present invention, an arm shaft or a post arm has an elastic portion. In addition, the arm shaft comes in contact with a hole of the post arm at two contact points in an upper opening of the hole and at two contact points in a lower opening of the hole. In such a structure, the post arm is rotatable around the arm shaft, while a jolt between the arm shaft and the hole, and a variation in the relative angle between the elements, are rarely caused. As a result, a small sized, inexpensive tape guidepost mechanism, which has a simple structure, in which the slant of each element is more accurately controlled, and which achieves decreases in size and cost of the magnetic recording/reproducing apparatus, can be obtained.

Thus, the invention described herein makes possible the advantages of providing a small sized, inexpensive tape guide post mechanism for use in a magnetic recording/reproducing apparatus, which has a simple structure, in which the slant of each element is accurately controlled, and which achieves decreases in size and cost of the magnetic recording/reproducing apparatus.

These and other advantages of the present invention will become apparent to those skilled in the art upon reading and understanding the following detailed description with reference to the accompanying figures.

DESCRIPTION OF THE PREFERRED EMBODIMENTS (Embodiment 1).

Hereinafter, embodiment 1 of the present invention will be described with reference to FIGS. 1 and 2.

Figure 1:
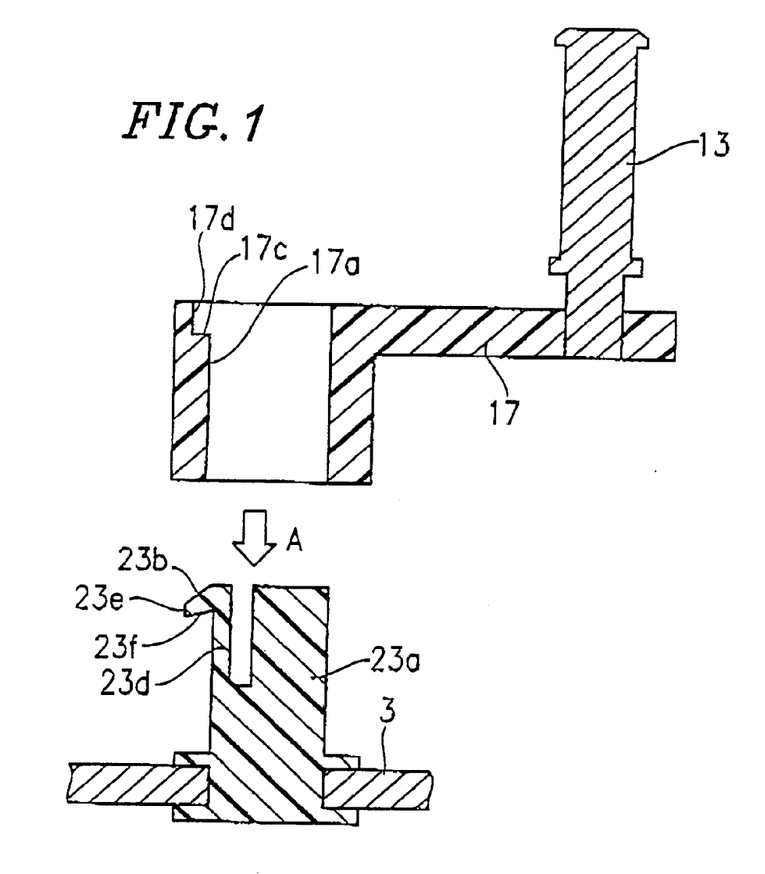
FIG. 1 is a cross-sectional view of an exploded tape guide post mechanism according to embodiment 1 of the present invention.

FIG. 1 is a cross-sectional view of an exploded tape guide post mechanism according to embodiment 1 of the present invention. FIG. 2 is a cross-sectional view of the tape guide post mechanism according to embodiment 1. The structure and operation of a magnetic recording/reproducing apparatus which uses the tape guide post mechanism of embodiment 1 are the same as those of the above-described conventional magnetic recording/reproducing apparatus, except for the T3-arm 17 and relevant elements thereof. Thus, only the T3-arm 17 and the relevant elements thereof are described below.

In FIG. 1, reference numeral 17 denotes the T3-arm, which is a post arm. The T3-arm 17 has a T3-post 13, which is one of the constituent elements of a tape running system. A T3-arm shaft 23a is made of a resin and fixed to a base 3. Reference numeral 23d denotes an elastic portion, which is formed integrally with the T3-arm shaft 23a. The elastic portion 23d has a claw 23b. Reference numeral 23e denotes a tip portion of the claw 23b, and reference numeral 23f denotes a lower face portion of the claw 23b. Reference numeral 17a denotes a hole formed in the T3-arm 17. In embodiment 1, the internal surface of the hole 17a has a cylindrical shape, but the present invention is not limited thereto. Reference numeral 17c denotes a step in the hole 17a, and reference numeral 17d denotes an abutment portion in the hole 17a. FIG. 1 shows the exploded tape guidepost mechanism. The T3-arm 17 is moved in the direction indicated by arrow A of FIG. 1 until the T3-arm 17 is mounted on the T3-arm shaft 23a in place as shown in FIG. 2.

An operation of the tape guide post mechanism of embodiment 1 having the above structure is described with reference to FIG. 2.

Figure 2:
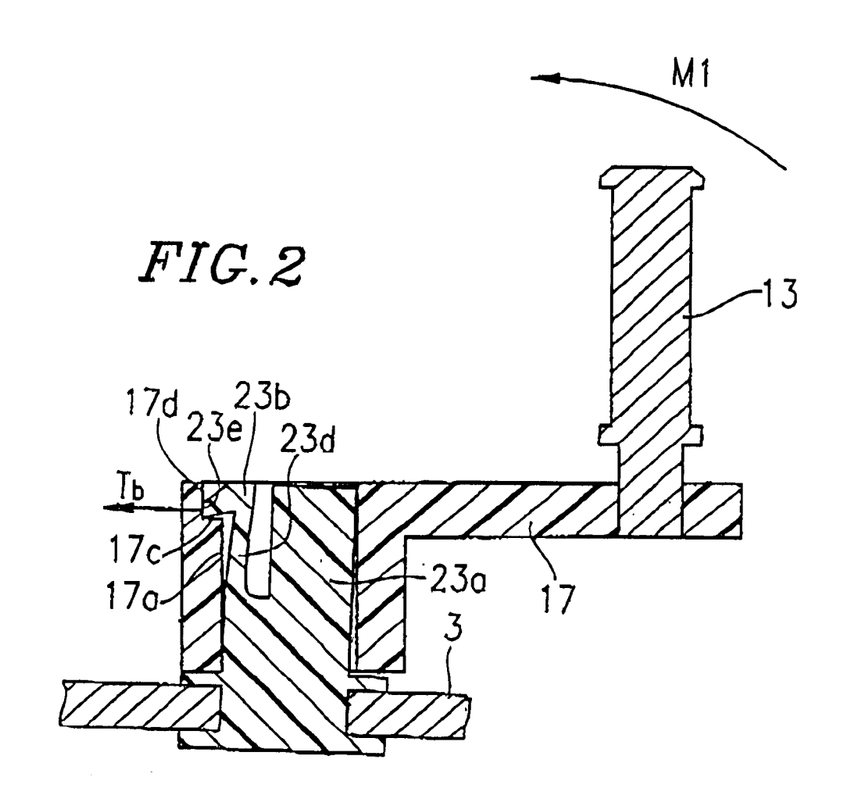
FIG. 2 is a cross-sectional view of the tape guide post mechanism according to embodiment 1.

In FIG. 2, the T3-arm shaft 23a extends through the hole 17a of the T3-arm 17 so as to rotatably support the T3-arm 17. The lower face portion 23f of the claw 23b abuts the step 17c so that the T3-arm 17 is prevented from disengaging upwardly from the T3-arm shaft 23a. In the meantime, the elastic portion 23d is elastically deformed, and the tip portion 23e of the claw 23b abuts the abutment portion 17d of the T3-arm 17, such that the tip portion 23e presses the abutment portion 17d in a direction denoted by an arrow Tb. That is, a pressure Tb is applied to the T3-arm 17 in a radial direction of the T3-arm shaft 23a, so that a rotation moment represented by an arrow M1 is constantly applied to the T3-arm 17. If the rotation moment represented by the arrow M1 is sufficiently large with respect to variations in external forces, such as the weight of the T3-arm 17, the tape tension, etc., the amount and direction of slant of the T3-post 13 can be kept constant even in the presence of the attitude change of the magnetic recording/reproducing apparatus, a change in the running state of a tape, such as the running direction of the tape, the tape tension, or the like.

As described above, according to embodiment 1 of the present invention, the elastic portion 23d of the T3-arm shaft 23a presses the abutment portion 17d of the T3-arm 17 in a radial direction of the T3-arm shaft 23a, so that a jolt between the hole 17a of the T3-arm 17 and the T3-arm shaft 23a is counteracted in a predetermined direction. As a result, a variation of the slant of the T3-post 13, which may be ±0.36° at a maximum in the conventional example, is decreased to about 0°. Thus, for example, the finishing accuracy of the internal diameter of the hole of the post arm (in embodiment 1, the hole 17a of the T3-arm 17) can be decreased; the finishing accuracy of the diameter of the arm shaft (the T3-arm shaft 23a) can be decreased; the accuracy of the slant of the tape guide post (the T3-post 13) with respect to the hole of the post arm can be decreased; or the accuracy of the slant of the arm shaft with respect to the base 3 can be decreased. Therefore, each of the parts of the recording/reproducing apparatus can be produced at a lower cost.

Furthermore, the total inspection steps performed for the slant of each element, the accuracy of the diameter of each hole, and the accuracy of the diameter of each shaft can be omitted. Thus, the number of production steps can be decreased, and accordingly, the production cost can be decreased. Furthermore, even when the shaft length of the arm shaft (in embodiment 1, effective shaft length L) is decreased, the variation of the slant of the tape guide post (the T3-post 13) does not significantly increase. Thus, the size of the recording/reproducing apparatus can be decreased.

Figure 10:
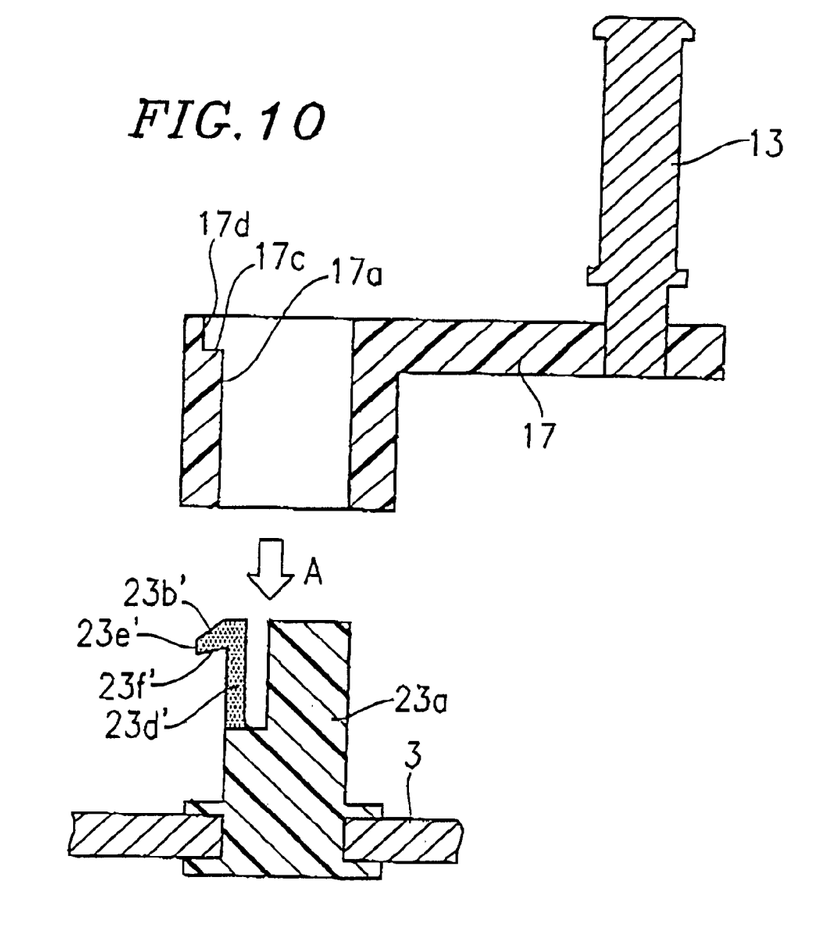

In embodiment 1, as described above, the elastic portion 23d and the claw 23b are formed integrally with the T3-arm shaft 23a from the same material. However, according to the present invention, the elastic portion 23d and the claw 23b may be formed of a material different from that of the T3-arm shaft 23a, or may be formed as separate parts from the T3-arm shaft 23a (as shown in FIG. 10).

In embodiment 1, as described above, the elastic portion 23d of the T3-arm shaft 23a presses the T3-arm 17 in a radial direction of the T3-arm shaft 23a. However, according to the present invention, the elastic portion 23d may press the T3-arm 17 in a direction different from a radial direction of the T3-arm shaft 23a. For example, the elastic portion 23d may press the T3-arm 17 in a thrust direction, so that a rotation moment is generated in the T3-arm 17, and accordingly, a jolt between the hole 17a of the T3-arm 17 and the T3-arm shaft 23a is counteracted in a predetermined direction.

(Embodiment 2)

Hereinafter, embodiment 2 of the present invention will be described with reference to FIGS. 3 and 4.

Figure 3:
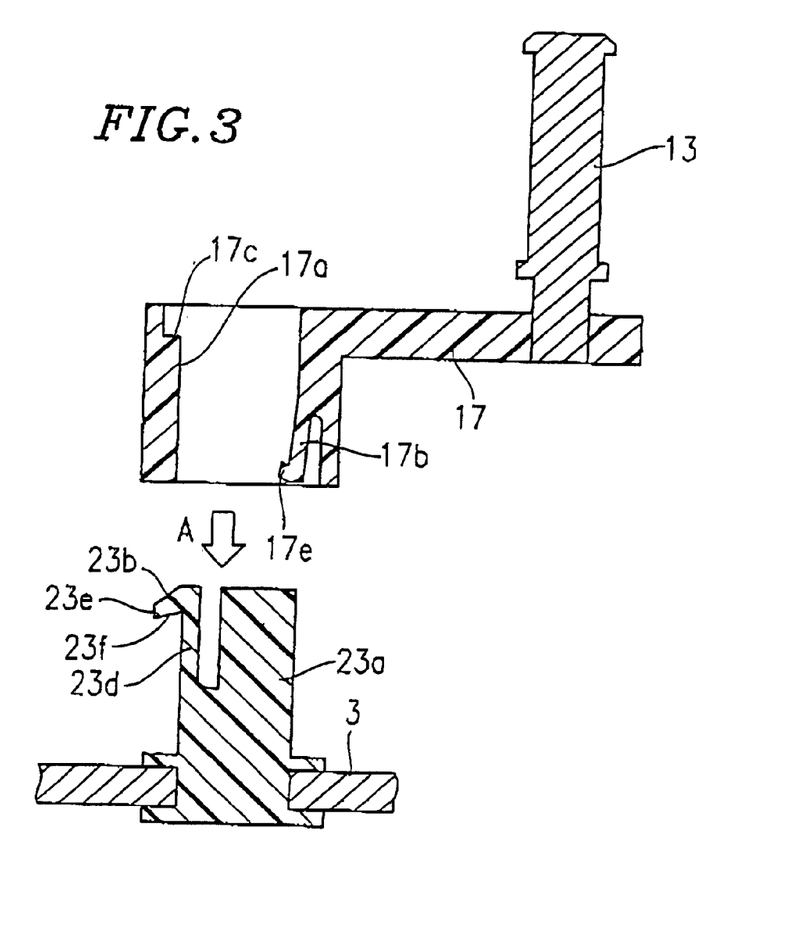
FIG. 3 is a cross-sectional view of an exploded tape guide post mechanism according to embodiment 2 of the present invention.

FIG. 3 is a cross-sectional view of an exploded tape guide post mechanism according to embodiment 2 of the present invention. FIG. 4 is a cross-sectional view of the tape guide post mechanism according to embodiment 2.

In FIG. 3, the T3-arm 17 is made of a resin, and has a T3-post 13. The T3-post 13 is one of the constituent elements of a tape running system. Reference numeral 17b denotes an elastic portion, which is formed integrally with the T3-arm 17 in the hole 17a of the T3-arm 17. The elastic portion 17b has an abutment portion 17e at the tip thereof. Reference numeral 17c denotes a step formed in the hole 17a. A T3-arm shaft 23a is made of a resin and fixed to a base 3. Reference numeral 23d denotes an elastic portion, which is formed integrally with the T3-arm shaft 23a. The elastic portion 23d has a claw 23b. Reference numeral 23e denotes a tip portion of the claw 23b, and reference numeral 23f denotes a lower face portion of the claw 23b. FIG. 3 shows the exploded tape guide post mechanism. The T3-arm 17 is moved in the direction indicated by arrow A of FIG. 3 until the T3-arm 17 is mounted on the T3-arm shaft 23a in place as shown in FIG. 4.

An operation of the tape guide post mechanism of embodiment 2 having the above structure is described with reference to FIG. 4.

Figure 4:
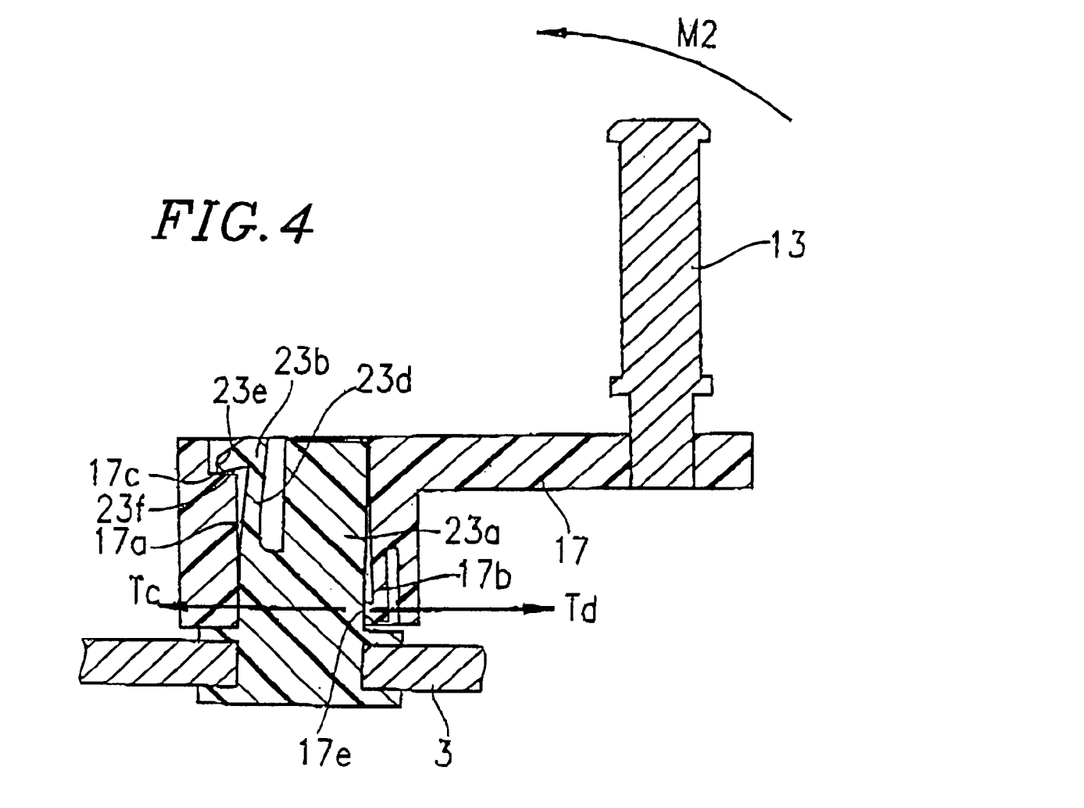
FIG. 4 is a cross-sectional view of the tape guide post mechanism according to embodiment 2.

In FIG. 4, the T3-arm shaft 23a extends through the hole 17a of the T3-arm 17 so as to rotatably support the T3-arm 17. The lower face portion 23f of the claw 23b abuts the step 17c so that the T3-arm 17 is prevented from disengaging upwardly from the T3-arm shaft 23a. In the meantime, the elastic portion 17b is elastically deformed, and the abutment portion 17e abuts the external surface of the T3-arm shaft 23a, such that the abutment portion 17e presses the T3-arm shaft 23a with force Tc in a radial direction of the T3-arm shaft 23a.

As a result, reaction force Td is generated at the abutment portion 17e. As a matter of course, the magnitude of force Tc is equal to that of reaction force Td (Tc=Td). Thus, due to reaction force Td, a rotation moment indicated by an arrow M2 is constantly caused in the T3-arm 17. If the rotation moment represented by the arrow M2 is sufficiently large with respect to variations in external forces, such as the weight of the T3-arm 17, the tape tension, etc., the amount and direction of slant of the T3-post 13 can be kept constant even in the presence of the attitude change of the magnetic recording/reproducing apparatus, a change in the running state of a tape, such as the running direction of the tape, the tape tension, or the like.

As shown in FIG. 4, in embodiment 2, the tip portion 23e of the claw 23b does not abut the T3-arm 17. That is, the elastic portion 17b does not press the T3-arm shaft 23a in the radial direction.

As described above, according to embodiment 2 of the present invention, the elastic portion 17b of the T3-arm 17 presses the T3-arm shaft 23a in a radial direction, so that a jolt between the hole 17a of the T3-arm 17 and the T3-arm shaft 23a is counteracted in a predetermined direction. As a result, a variation of the slant of the T3-post 13, which may be ∓0.36° as a maximum in the conventional example, is decreased to about 0°. Thus, as achieved in embodiment 1, a small sized, inexpensive tape guide post mechanism, which has a simple structure, in which the slant of each element is accurately controlled, and which achieves decreases in size and cost of the magnetic recording/reproducing apparatus, is provided.

Figure 11:
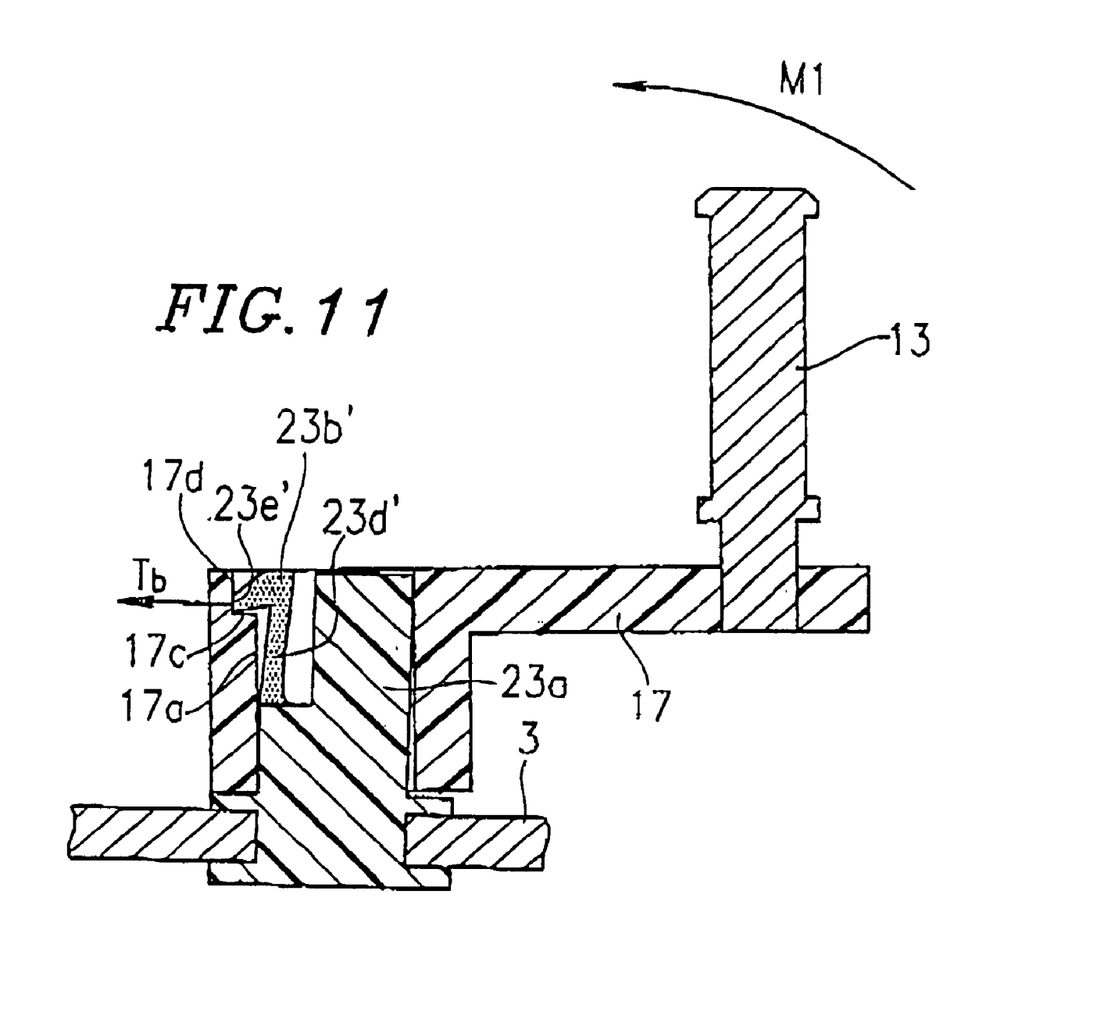

In embodiment 2, as described above, the elastic portion 17b and the abutment portion 17e are formed integrally with the T3-arm 17 from the same material. However, according to the present invention, the elastic portion 17b and the abutment portion 17e may be formed of a material different from that of the T3-arm 17, or may be formed as separate parts from the T3-arm 17 (as shown in FIG. 11).

In embodiment 2, as described above, the elastic portion 17b of the T3-arm 17 presses the T3-arm shaft 23a in a radial direction of the T3-arm shaft 23a. However, according to the present invention, the elastic portion 17b may press the T3-arm shaft 23a in a direction different from a radial direction of the T3-arm shaft 23a. For example, the elastic portion 17b may press the T3-arm shaft 23a in a thrust direction, so that a rotation moment is generated in the T3-arm 17, and accordingly, a jolt between the hole 17a of the T3-arm 17 and the T3-arm shaft 23a is counteracted in a predetermined direction.

In embodiment 2, as described above, the tip portion 23e of the claw 23b does not abut the T3-arm 17, i.e., the elastic portion 17b does not press the T3-arm shaft 23a in the radial direction. However, according to the present invention, as described in embodiment 1, the tip portion 23e of the claw 23b may be structured so as to come in contact with the T3-arm 17, such that the elastic portion 17b presses the T3-arm shaft 23a in the radial direction. With such an arrangement, a rotation moment again can be caused in the T3-arm 17 in the direction indicated by the arrow M2.

In embodiment 2, as described above, the elastic portion 17b may be formed in the hole 17a of the T3-arm 17. However, according to the present invention, the elastic portion 17b maybe formed at a different position integrally with the T3-arm 17, such that the elastic portion 17b presses the T3-arm shaft 23a in a radial direction.

(Embodiment 3)

Figure 5A:
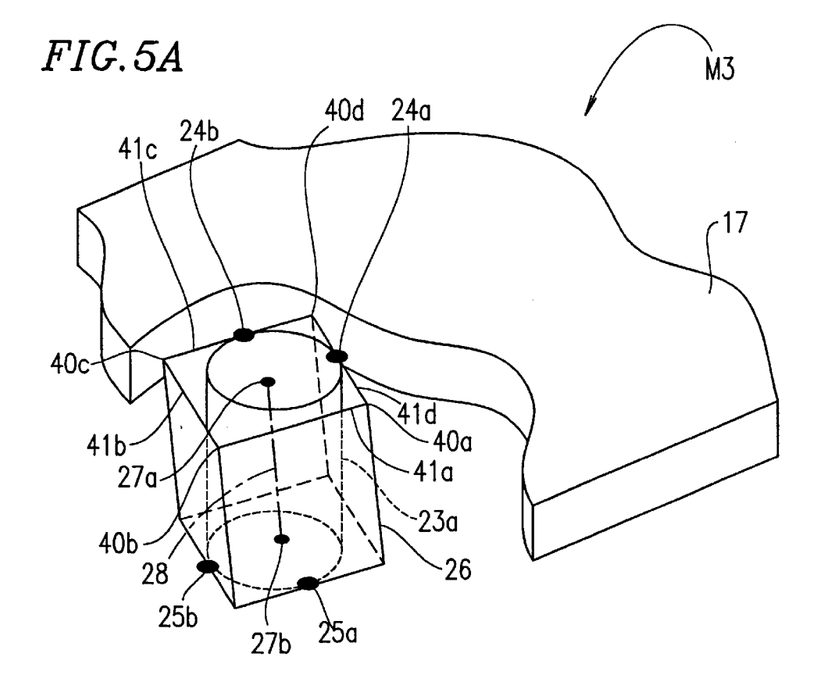
FIG. 5A is a perspective view showing the details about engagement between a hole and a shaft in a tape guide post mechanism according to embodiment 3 of the present invention.

FIG. 5A is a perspective view showing the details of engagement between a hole and a shaft in a tape guide post mechanism according to embodiment 3 of the present invention. Details of the structure and operation of the tape guide post mechanism of embodiment 3, which are the same as those of embodiment 1, are not described in this section, but only the different features are described below with reference to FIG. 5A.

In FIG. 5A, the elastic portion 23d of the T3-arm shaft 23a, which was described in embodiment 1, is not shown for clarity of illustration, but the elastic portion 23d of embodiment 3 has the same structure as that of embodiment 1. In FIG. 5A, reference numeral 26 denotes a hole formed in the T3-arm 17. Although, in embodiment 1, the internal surface of the hole of the T3-arm 17 (hole 17a) has a cylindrical shape, the internal surface of the hole 26 according to embodiment 3 has the shape of a rectangular prism. The T3-arm shaft 23a extends through a rectangular hole 26 of the T3-arm 17 so as to rotatably support the T3-arm 17. The step 17c provided for preventing the T3-arm 17 from disengaging upwardly from the T3-arm shaft 23a is not shown in FIG. 5A. As in embodiment 1, due to the elastic portion 23d (not shown in FIG. 5), a rotation moment is caused in the T3-arm 17 in a direction indicated by an arrow M3 (coming somewhat up and out of the page). Reference numerals 24a and 24b are two upper contact points between the T3-arm shaft 23a and the hole 26 of the T3-arm 17. Reference numerals 25a and 25b are two lower contact points between the T3-arm shaft 23a and the hole 26 of the T3-arm 17. That is, the T3-arm shaft 23a comes in contact with the hole 26 of the T3-arm 17 at these four contact points including the two upper contact points 24a and 24b and the two lower contact points 25a and 25b as shown in FIG. 5. Even in this state, the T3-arm 17 is rotatable around the T3-arm shaft 23a. In the structure of embodiment 3, even in the presence of the attitude change of the magnetic recording/reproducing apparatus, a change in the running state of a tape, such as the running direction of the tape, the tape tension, or the like, the T3-arm shaft 23a comes in contact with the hole 26 of the T3-arm 17 always at the four contact points 24a, 24b, 25a, and 25b, and the four contact points 24a, 24b, 25a, and 25b never shift. Thus, the amount and direction of the slant of the T3-post 13 are always maintained to be constant. Accordingly, with such a feature, variations in the amount and position of a center line 28 of the hole 26, which connects the center of the upper opening of the hole 26 ("upper hole center 27a") and the center of the lower opening of the hole 26 ("lower hole center 27b"), are further reduced as compared with those of embodiment 1.

Figure 5B:
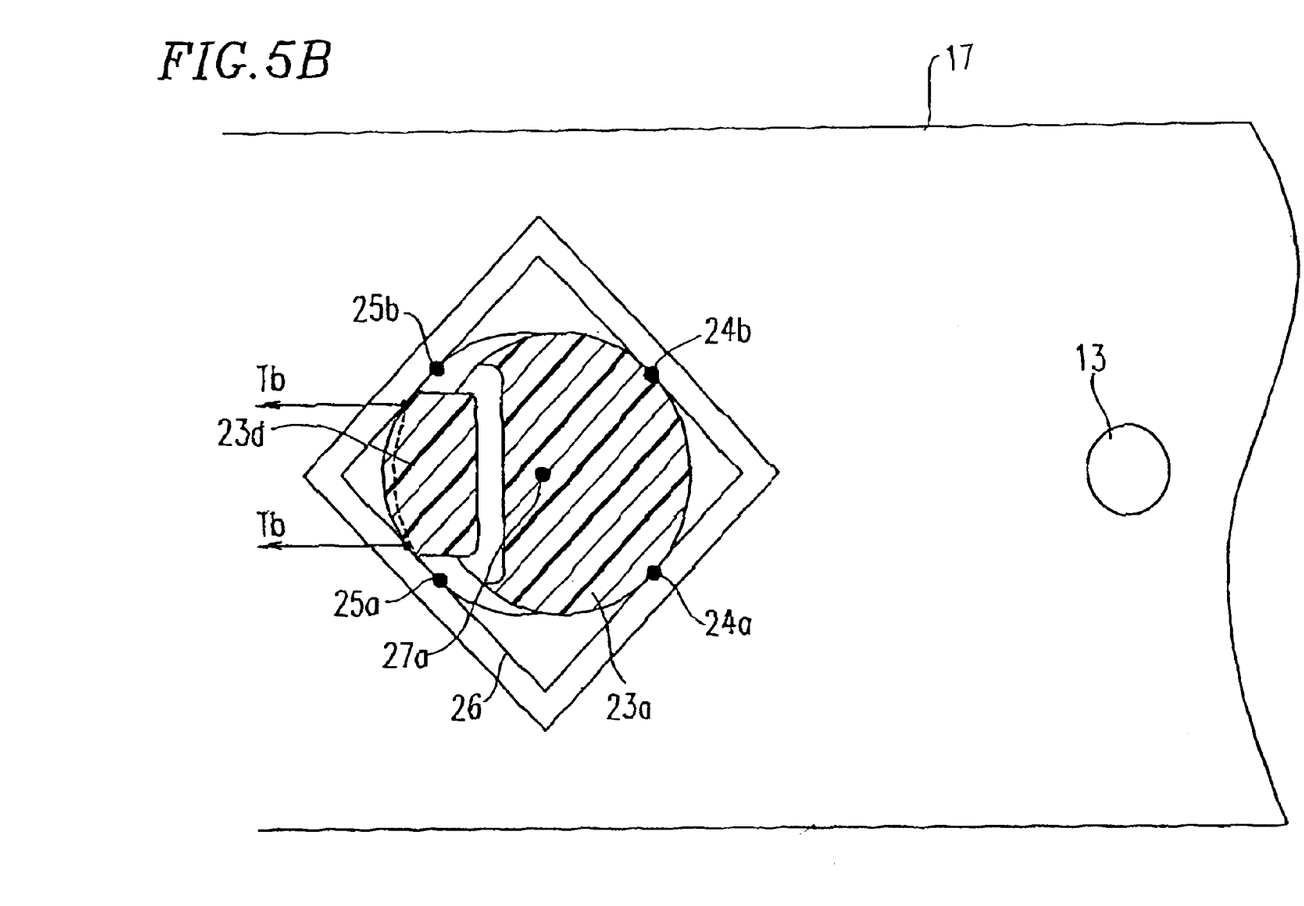
FIG. 5B is a top view showing the details about engagement between a hole and a shaft in a tape guide post mechanism according to embodiment 3.

FIG. 5B is a top view showing the details about engagement between a hole and a shaft in a tape guide post mechanism according to embodiment 3.

As described above, according to embodiment 3 of the present invention, the external surface of the T3-arm shaft 23a comes in contact with the hole 26 at the two upper contact points 24a and 24b and the two lower contact points 25a and 25b. In such a structure, a variation in the slant of the T3-post 13 is further reduced as compared with those of embodiment 1. Therefore, a tape guide post mechanism where the slant of the T3-post 13 is accurately controlled can be obtained.

In embodiment 3, the hole 26 of the T3-arm 17 has the shape of a square pole for the clarity of explanation, but the shape of the hole 26 is not limited thereto. The hole 26 may have any shape so long as the T3-arm shaft 23a is in contact with the hole 26 at at least two upper contact points and at least two lower contact points. For example, the hole 26 may have the shape of a hexagonal or other polygonal shaped pole.

Furthermore, in embodiment 3, corners 40a, 40b, 40c, and 40d of the upper opening of the hole 26 are not necessary so long as at least two contact points are secured. This also applies to the lower opening of the hole 26.

Furthermore, in embodiment 3, sides 41a, 41b, 41c, and 41d of the upper opening of the hole 26 are not necessary to be linear so long as at least two contact points are secured. This also applies to the lower opening of the hole 26.

In embodiment 3, the upper and lower openings of the hole 26 have the same square shape. However, according to the present invention, it is not necessary to form the hole 26 such that the upper and lower openings have the same shape.

In the above description, the above-described feature of embodiment 3 is added to the features of embodiment 1. However, the above-described feature of embodiment 3 may be added to the features of embodiment 2.

As described above, according to the present invention, the slant of the tape guidepost for guiding running of the magnetic tape can be controlled in a highly accurate manner by a simple mechanism. Thus, a small sized, inexpensive tape guide post mechanism, which achieves a decrease in size of the magnetic recording/reproducing apparatus, can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape guide post mechanism for guiding running of a tape, comprising:
    a post arm, the post arm including
        a tape guide post, around which the tape is looped, and which guides running of the tape, and
        a hole;
    an arm shaft which engages with the hole and rotatably supports the post arm,
    wherein the arm shaft has an elastic portion which presses a portion of the post arm.

2. A tape guide post mechanism according to claim 1, wherein an external surface of the arm shaft comes in contact with the hole of the post arm at two points in an upper opening of the hole and at two points in a lower opening of the hole.

3. A tape guide post mechanism according to claim 1, wherein the elastic portion and remainder of the arm shaft are made of different materials or discrete parts.

4. A tape guide post mechanism for guiding running of a tape, comprising:
    a post arm, the post arm including
        a tape guide post, around which the tape is looped, and which guides running of the tape, and
        a hole;
    an arm shaft which engages with the hole and rotatably supports the post arm,
    wherein the post arm has an elastic portion which presses an external surface of the arm shaft.

5. A tape guide post mechanism according to claim 4, wherein the external surface of the arm shaft comes in contact with the hole of the post arm at two points in an upper opening of the hole and at two points in a lower opening of the hole.

6. A tape guide post mechanism according to claim 4, wherein the elastic portion and remainder of the post arm are made of different materials or discrete parts.

* * * * *